(12) United States Patent
Zahedi et al.

(10) Patent No.: US 6,202,277 B1
(45) Date of Patent: Mar. 20, 2001

(54) REUSABLE HARD TOOLING FOR ARTICLE CONSOLIDATION AND CONSOLIDATION METHOD

(75) Inventors: Ahmad P. Zahedi; Nicholas Damlis, both of Cincinnati, OH (US); Paul A. Siemers, Clifton Park, NY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/429,284

(22) Filed: Oct. 28, 1999

(51) Int. Cl.[7] ................................................. B23P 17/00
(52) U.S. Cl. .................. 29/423; 428/212; 264/316; 249/112; 425/89
(58) Field of Search ............... 29/423, 17.5, 17.9, 29/404, 418, 425, 592; 228/157, 190, 193, 118; 419/10, 48, 61; 156/89, 285; 72/465, 54; 164/34; 264/221, 313; 249/112; 425/89

(56) References Cited

U.S. PATENT DOCUMENTS

| | | |
|---|---|---|
| 2,653,494 | 9/1953 | Creutz ........................................ 78/81 |
| 3,340,053 | 9/1967 | Hodge et al. ............................. 75/208 |
| 3,444,608 | 5/1969 | Conn, Jr. et al. ........................ 29/423 |
| 3,550,252 | 12/1970 | Conn et al. ........................... 29/470.9 |
| 3,939,241 | 2/1976 | Powell et al. ........................... 264/111 |
| 3,979,815 | 9/1976 | Nakanose et al. ....................... 29/423 |
| 4,094,672 | 6/1978 | Fleck et al. ............................. 78/226 |
| 4,126,659 | * 11/1978 | Blad ......................................... 264/90 |
| 4,269,053 | 5/1981 | Argrawal et al. .......................... 72/42 |
| 4,390,489 | 6/1983 | Segal ..................................... 264/126 |
| 4,673,549 | 6/1987 | Ecer ......................................... 419/10 |
| 4,683,099 | * 7/1987 | Buxton et al. ......................... 264/511 |
| 4,706,361 | 11/1987 | Meyer et al. ............................ 29/423 |
| 4,920,640 | * 5/1990 | Enole et al. ............................. 29/852 |
| 4,983,339 | 1/1991 | Boncoeur et al. ....................... 264/56 |
| 4,984,348 | 1/1991 | Cadwell .................................. 29/423 |
| 5,049,329 | * 9/1991 | Allaire et al. ........................... 264/60 |
| 5,069,383 | 12/1991 | Cooper et al. ......................... 228/157 |
| 5,082,623 | 1/1992 | Ekbom ...................................... 419/8 |
| 5,096,518 | 3/1992 | Fujikawa et al. ....................... 156/89 |
| 5,147,086 | 9/1992 | Fujikawa et al. ..................... 228/243 |
| 5,439,631 | * 8/1995 | Schneider et al. .................... 264/293 |

* cited by examiner

*Primary Examiner*—S. Thomas Hughes
*Assistant Examiner*—John C. Hong
(74) *Attorney, Agent, or Firm*—Andrew C. Hess; Gerry S. Gressel

(57) ABSTRACT

Hard tooling for consolidation of a workpiece there between is preserved for reuse by disposing between the tooling and a workpiece a plurality of distinct, superimposed sacrificial sheets, for example metal foils, to isolate the workpiece from the tooling. The sacrificial sheets are substantially non-adherent one to another; and a sheet in contact with a workpiece surface is substantially chemically non-reactive with such workpiece surface.

14 Claims, 2 Drawing Sheets

REUSABLE HARD TOOLING FOR ARTICLE CONSOLIDATION AND CONSOLIDATION METHOD

BACKGROUND OF THE INVENTION

This invention relates to tooling and method for consolidation of an article, and, more particularly, it relates to hard tooling that is reusable for consolidation of more than one article.

Certain article manufacture that includes the combination of relatively high temperature and high pressure consolidation steps requires generally inflexible, rigid tooling, sometimes referred to as hard tooling. Such tooling, generally made of an alloy based on at least one of Fe, Ni and Co for strength at high temperatures, is needed to provide support and accurate dimensions for the article during consolidation. That general type of consolidation or forming method has been widely reported under a variety of names including super plastic forming/diffusion bonding, hot isostatic pressing, vacuum hot pressing, and others. Examples of articles for the aerospace industry manufactured using one or more of such methods include, but are not limited to, composite airfoils, ducts, disks, shafts, frames, rings, shells, links, and brackets. Frequently, very close tolerances are designed in the article and required in hard tooling used during manufacture. Accordingly, the tooling can be relatively costly to manufacture.

In the manufacture of articles intended to operate at high temperatures under strenuous operating conditions, article surface contamination is to be avoided. Use of a stop-off or release type of chemical material or coating at an interface between the hard tooling and an article surface, as proposed by certain prior methods, has been observed to result in undesirable surface contamination of the article and/or delamination between plies of an article manufactured by consolidation of a plurality of superimposed plies. Therefore, such potentially contaminating substances are to be avoided between tooling and article surfaces during high temperature, high pressure consolidation. As a consequence, a surface of current hard tooling has been observed to bond with an article surface at such high temperatures and pressures. Then, to retrieve the article from the hard tooling, the tooling generally is either machined away, chemically etched away, or a combination of such methods. As a result, the relatively costly hard tooling is damaged, is not reusable and generally is destroyed.

Reported consolidation methods and tooling have included both the above described type of firm or hard tooling to which the present invention relates, as well as the generally soft tooling that is intended to be deformed during, and/or discarded after, consolidation processing. The problem of release of the article from the tooling, and of article surface contamination has been referred to in a number of U.S. patents. For example, Hodge et al in U.S. Pat. No. 3,340,053 (patented Sep. 5, 1967) during powder metal consolidation interpose a liner of Mo, W or their mixture between tungsten metal particles and an exterior casing that can contaminate the tungsten particles. In a roll diffusion bonding method, Conn, Jr., et al in U.S. Pat. No. 3,444,608 and U.S. Pat. No. 3,550,252 (patented May 20, 1969 and Dec. 29, 1970, respectively) dispose a single, relatively thin foil of Ti at selective points along a mandrel to facilitate removal of a roll bonded article. Release coatings of different coefficients of thermal expansion, for example boron nitride and yttria, are described in U.S. Pat. No. 4,269,053—Agrawal et al. (patented May 26, 1981). A combination of a soft tooling disposable metal sheath with an internal coating of tantalum powder to embrittle the sheath during consolidation for ease of sheath removal is disclosed by Boncoeur et al. in U.S. Pat. No. 4,983,339 (patented Jan. 8, 1991). Cooper et al. in U.S. Pat. No. 5,069,383 (patented Dec. 3, 1991) employ a stop-off material in the form of a series of individual porous lamelar sheets disposed between stacked sheets of metal to avoid bonding between the metal sheets during conduct of a superplastic forming/diffusion bonding process. Fujikawa et al. in U.S. Pat. No. 5,096,518 and U.S. Pat. No. 5,147,086 (patented Mar. 17, 1992 and Sep. 15, 1992, respectively) use a ceramic or metal layer as a stop-off material over a material to be subjected to hot isostatic pressing.

As was mentioned above, bonding of relatively costly hard tooling to an article surface during high temperature, high pressure consolidation generally has resulted in destruction of the tooling in order to recover the consolidated article. Thus the cost of each article includes or reflects the cost of the destroyed tooling. Reusable tooling that at the same time does not contaminate an article surface can reduce the cost of an individual article, with the cost of the tooling being spread over many articles.

BRIEF SUMMARY OF THE INVENTION

The present invention, in one form, provides, a first and a second plurality of distinct, superimposed sacrificial sheets in contact one with another, in spaced-apart tooling used for applying pressure to consolidate a workpiece there-between. The workpiece comprises spaced-apart first and second workpiece surfaces at which consolidating pressure is applied. The first plurality of sheets is for disposition at the first workpiece surface; the second plurality of sheets is for disposition at the second workpiece surface. Each of the first and second plurality of sheets includes an inner sheet for disposition at and contact with a workpiece surface, and an outer sheet for disposition at and contact with a tooling surface. The inner and outer sheets are substantially non-adherent one with the other, and the inner sheets are substantially chemically non-reactive with its respective workpiece surface.

In another form, the present invention provides the first and the second plurality of foils for use in a method for consolidating a workpiece between spaced-apart first and second substantially rigid tooling surfaces. Each of the above-described plurality of foils is disposed between and in contact with a workpiece surface and its respective tooling surface prior to operation of a consolidation method.

BRIEF DESCRIPTION OF THE DRAWINGS

FIG. 2 is a diagrammatic sectional view of cylindrical spaced-apart inner and outer hard tooling assembled for consolidation of a workpiece there-between.

DETAILED DESCRIPTION OF THE INVENTION

One application of the present invention is in the consolidation of high temperature structures or articles made of composite materials. A form of such materials well known in the art includes metal matrix composites, typical of which is a titanium matrix reinforced or strengthened with filaments of silicon carbide. It is common practice to superimpose, prior to consolidation, a plurality of layers or plies of such a composite, frequently with the layers or plies at different angles to one another as desired to develop desired properties in the article. The layers or plies have been disposed by a variety of well known methods, for example winding of plies or ribbons of material on a mandrel, or stacking of plies or sheets of material in a mold to provide an article preform. Consolidation of an article from a preform of such composite material includes application of a combination of high temperature and high pressure to the article preform through hard tooling about the article preform, generally in a non-oxidizing atmosphere or vacuum.

As was discussed above, bonding of hard tooling to an article surface can result in destruction of the tooling in order to retrieve the article after consolidation, and added cost to the manufacture of the article. The present invention reduces the cost of tool removal time and enables hard tooling to be reused to manufacture more than one article, thereby spreading the cost of the tooling over many articles. The invention will be more fully understood by reference to the drawings.

Figure 1:
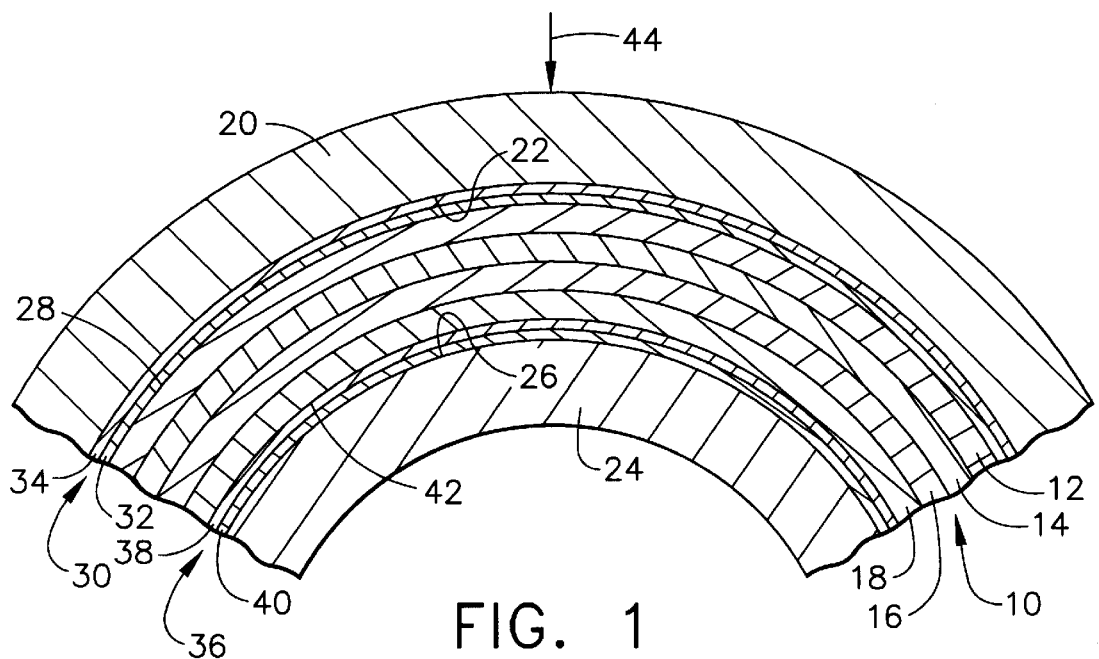
FIG. 1 is a fragmentary sectional view of one embodiment of the present invention including a first and a second plurality of sheets as metal foils disposed between inner and outer hard tooling during consolidation of a composite, laminated workpiece.

FIG. 1 is a fragmentary sectional view of one embodiment of the present invention disposed for consolidation of a workpiece preform, shown generally at 10. Preform 10 includes a plurality of superimposed layers or plies 12, 14, 16, and 18. For example, each layer or ply was of a metal matrix composite material, typically a Ti matrix including strengthening fibers or filaments of silicon carbide. The layers can be of the same or different materials arranged as appropriate to develop in the consolidated article desired mechanical properties under intended operating conditions.

The embodiment of FIG. 1 includes a first hard, rigid tooling member 20, in this example an outer tooling member, including a first tooling member inner surface 22. Also included is a second hard, rigid tooling member 24, in this example an inner tooling member, including a second tooling member inner surface 26. An example of such combination of tooling members used in the evaluation of the present invention includes inner and outer cylindrical tooling members made of a strong metal that can withstand the high temperatures and pressures experienced during consolidation methods. Typically such a metal is selected from Fe, Ni, Co, and their alloys. The ends of the assembly have been capped to provide a closed container for consolidation there between of a workpiece preform under controlled conditions.

Disposed as shown in FIG. 1 between and in contact with the first inner tooling surface 22 and with a first workpiece or preform surface 28 is a first plurality of distinct, superimposed sacrificial sheets in the form of metal foils shown generally at 30. In this example, the foils are a pair of inner and outer foils 32 and 34, respectively. Foils 32 and 34 are in contact with one another but substantially will not adhere one to the other during consolidation at high temperatures and pressures. In addition, inner metal foil 32 is of a material that substantially will not contaminate and preferably not bond to first workpiece surface 28. For example, such foils or sheets can be of a metal selected from Mo, Ta, W, Cb or their alloys in evaluations in which the workpiece is a Ti matrix composite material. Similarly, a second plurality of such same type of distinct, superimposed sacrificial sheets in the form of metal foils shown generally at 36, in this example inner and outer foils 38 and 40, respectively, is disposed as shown between and in contact with second tooling surface 26 and with second workpiece or preform surface 42. During one form of the consolidation method using cylindrical hard tooling, external pressure shown by arrow 44 is applied to rigid tooling member 20 to press tooling member 20 toward workpiece preform 10 and fixed second tooling member 24, thereby applying pressure to surfaces 28 and 42 of preform 10. Such pressure, at an appropriate temperature and time, enables consolidation of the preform. In other forms, external pressures can be applied to the workpiece preform directly from both first and second tooling members. Such pressure consolidates workpiece preform 10, isolated from the hard tooling surfaces 22 and 26 by the first and second plurality of metal foils 30 and 36, between the tooling members. Typically, such consolidation method has been conducted within a heated, atmosphere-controlled autoclave.

Figure 2:
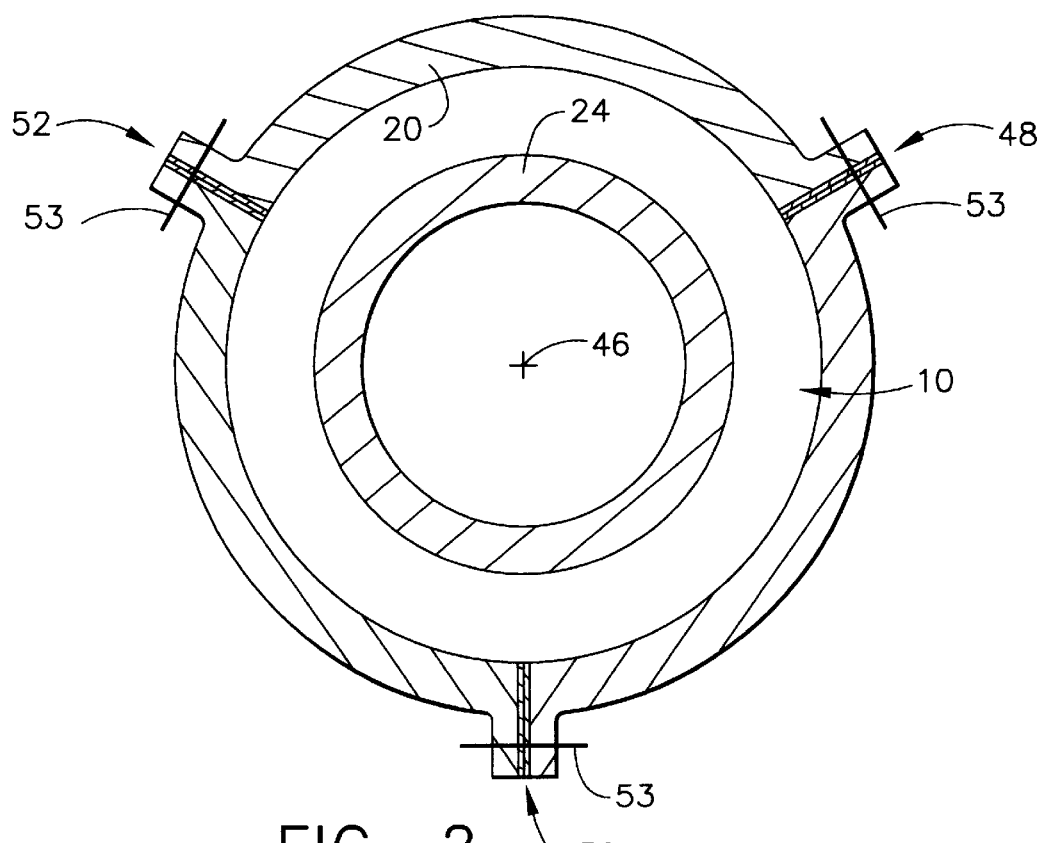

The diagrammatic sectional view of FIG. 2 shows an embodiment as described in FIG. 1 in which the second hard tooling member 24 is a cylindrical mandrel, having an axis 46 and about which composite workpiece preform 10 is disposed, such as by filament or ribbon winding. The first or outer hard tooling member 20, disposed over the preform 10, comprised three segments, as shown, with cooperating split flanges 48, 50 and 52 between the segments. One such flange is shown in more detail in the fragmentary sectional view of FIG. 3. The first and second plurality of sacrificial metal foils 30 and 36, respectively, not shown in FIG. 2, are disposed as in FIG. 1. First tooling member 20 is segmented for ease of disassembly from about the consolidated article after processing. To provide the rigid hard first tooling member 20, flanges 48, 50 and 52 are secured together by a joining or clamping means prior to processing, for example by welding or by securing with bolts represented at 53 in FIGS. 2 and 3.

Figure 3:
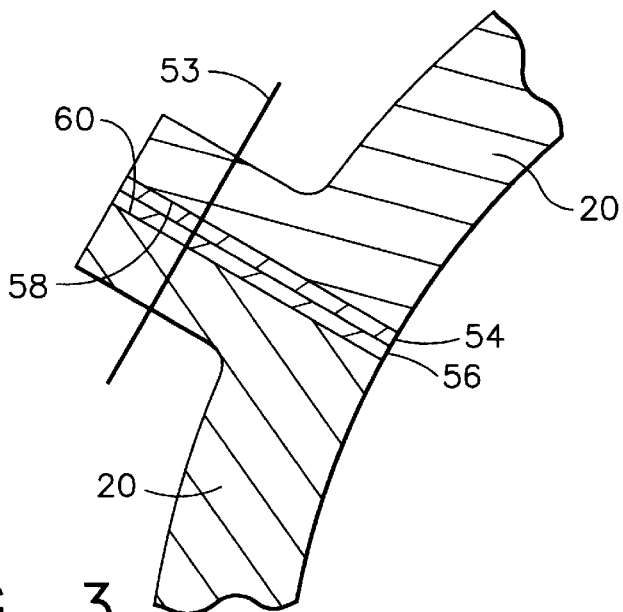
FIG. 3 is enlarged sectional view of a flange of the outer tooling in FIG. 2.

FIG. 3 is a sectional view of a flange, such as 52 in FIG. 2, between segments of first tooling member 20. In that embodiment, a plurality of distinct, sacrificial sheets, represented by metal foils 54 and 56 is disposed between flange surfaces 58 and 60 that cooperate to define the flange. Such sheets or foils 54 and 56 are substantially non-adherent one to the other to facilitate separation of the split flange after consolidation processing for removal of the consolidated article. Under high temperature consolidation conditions, it has been observed that a type of bonding can occur between substantially bare, closely mating surfaces as 58 and 60. Separation of such bonded surfaces can result in damage to the hard tooling members. However, the combination of such a plurality of substantially mutually non-bonding or non-adhering sheets with and between such hard tooling flange surfaces enables their relatively easy separation.

Figure 4:
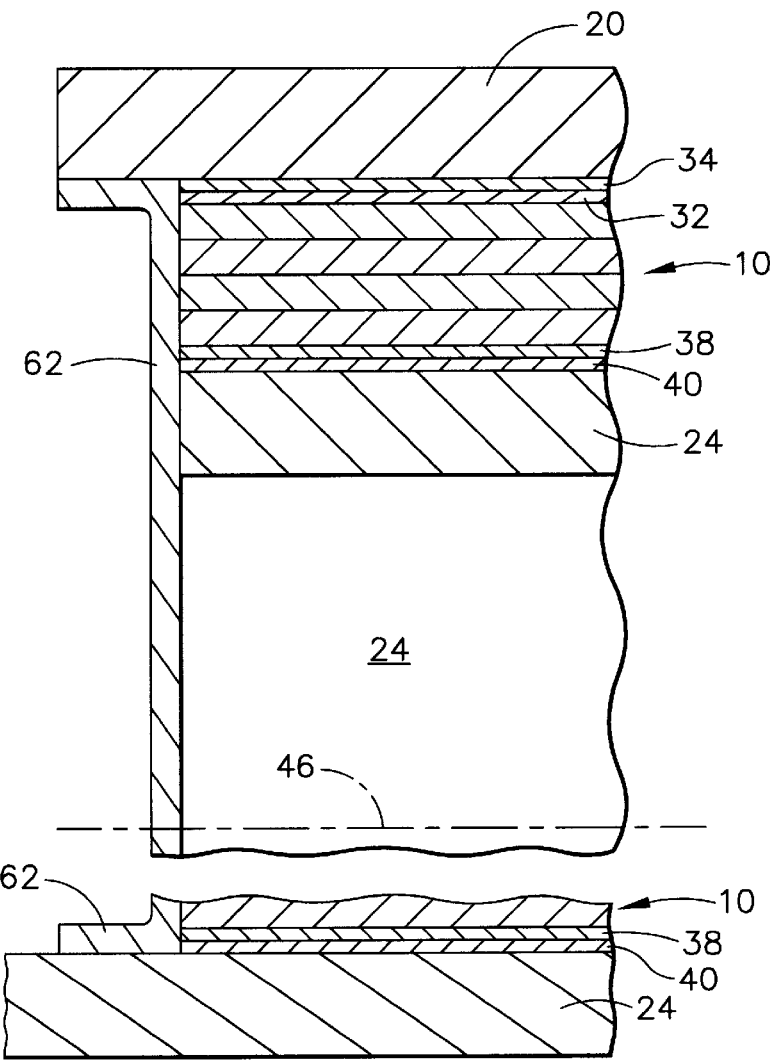
FIG. 4 is a fragmentary sectional view of an end showing closure of the type of tooling in FIG. 2.

As was mentioned above, one embodiment of the hard tooling arrangements of FIGS. 1 and 2 disposes end portions between the first and second hard tooling members 20 and 24. The end portions are disposed at each end of the tooling members to provide a cylindrical closed, sealed container for consolidation of a workpiece preform therein. The fragmentary sectional view of FIG. 4 shows one such embodiment in which a pair of end portions in the form of sacrificial end caps or end rings 62 are joined, such as by welding, one at each end between first hard tooling member 20 and second hard tooling member 24, to provide the closed container. Prior to consolidation processing, the atmosphere in the closed container thus provided is evacuated in a manner used in the art; and the container is sealed such as by welding and checked for leaks prior to consolidation processing.

After high temperature, high pressure consolidation of the workpiece preform into a composite article, the article was retrieved from the hard tooling members, such as 20 and 24, substantially without damage to the hard tooling. This was accomplished by removing the sacrificial end caps 62 such as by grinding at the welds that secured the end caps to the hard tooling. The clamping means or bolts 53 at split flanges 48, 50, and 52 securing segments of the first tooling member 20 were removed. Segments of first tooling member 20 were readily separated without damage to the mating flange surfaces, facilitated by separation at an interface between the non-bonding sacrificial metal foils between flange surfaces.

The first tooling member 20 was separated easily from the consolidated article at least at the interface between the first plurality of sacrificial metal foils 30 disposed between cooperating tooling and article surfaces. For example separation was at the interface between foils 32 and 34. Similarly, second tooling member 24 and the consolidated article were separated easily at least at the interface between the second plurality of sacrificial metal foils 36, for example at the interface between foils 38 and 40. Such separation occurred substantially without damage to the hard tooling members 20 and 24 that then could be reused for consolidation of additional workpiece preforms. Generally, this type of hard tooling has been manufactured to include close tolerances and/or surface finishes. Recovery substantially without damage to such tooling to enable repeated reuse constitutes a significant cost reduction in the manufacture of a consolidated article.

In some examples, sacrificial metal foils that substantially will not bond or adhere one to the other nevertheless have been observed to adhere to a surface of the article and/or the hard tooling over which a sacrificial foil was disposed. One feature of the present invention is that any such sacrificial metal foil adhering to a surface can be removed readily by a means that substantially does not adversely affect or change the tolerance and surface finish of the surface. For example, a metal foil adhering to a consolidated article surface can be removed by a chemical means, for example a bath of an appropriate acid that does not react with the article surface. A metal foil adhering to a hard tooling surface can be removed by such a chemical means, by machining to a tolerance position, etc. Removal by a means that substantially does not affect the hard tooling surface retains the tolerance and surface finish of the hard tooling. This enables reuse of the hard tooling, with the resulting savings as described above.

Use of the plurality of the non-adhering sacrificial metal foils between the split flanges, such as shown in FIG. 3, enables easy separation of the flanges for retrieval of a workpiece substantially without damage to the flange surfaces. Any portion of a metal foil adhering to a flange surface can be removed by a means as described above in connection with other hard tooling surfaces. Such removal that substantially does not affect the flange surface retains the tolerance and surface finish of the flange surface.

One specific example of practice of a form of the present invention is in the production of a substantially cylindrical duct for a gas turbine engine. Such an article has been consolidated at high temperature and pressure from a plurality of superimposed layers of a composite material including a Ti or Ti alloy matrix strengthened by fibers or filaments of silicon carbide. Such a composite, for example in the form of a ribbon or a plurality of plies, can be applied to and about a steel cylindrical mandrel, constituting inner hard tooling desired to be reused.

According to an embodiment of the present invention, prior to disposition of a Ti matrix composite 10 about inner mandrel 24, a pair of molybdenum metal foils 36, each of a thickness in the range of about 0.001–0.003", was disposed over steel surface 26 of tooling mandrel 24 intended to receive the composite. The foils of Mo, that substantially does not react with steel or with Ti, isolate the steel in hard tooling 24 and the Ti matrix composite 10 from interacting. Molybdenum is typical of metals in the group Mo, Ta, W, Cb and their alloys that substantially do not adhere or bond one to the other during a high temperature and pressure consolidation process.

After disposing layers, for example 12, 14, 16 and 18, of composite material 10 over the inner mandrel 24 to provide a workpiece preform, another pair of the same thickness Mo foils 30 was disposed over preform 10 to isolate the preform from steel inner surface 22 of the outer hard tooling. Then segmented outer cylindrical hard tooling 20, as shown in FIGS. 2 and 3 and including a pair of the same type of Mo foils 54 and 56 between surfaces of the flanges, was assembled about and in contact with Mo foils 30. In this example, the segments were secured together by welding, although securing with bolts can be used. To provide a closed cylindrical container about workpiece preform 10, a pair of circular steel end caps 62 was welded to the inner and outer hard tooling 20 and 24, as shown in FIG. 4.

In preparation for consolidation of workpiece preform 10, the interior of the closed cylindrical container was evacuated, as practiced in the art through a preaffixed port. Then the container was sealed and checked for leaks. The sealed container then was placed in an autoclave in which the temperature was increased to the range of about 1700–1800° F. Pressure was provided in the autoclave in the range of about 15–16 ksi., pressing outer hard tooling 20 toward preform 10 and inner mandrel 24 to consolidate preform 10. After processing in the range of about 3–4hours, the container was removed from the autoclave to retrieve the consolidated article from the tooling. End caps 62 and the means to secure the flanges such as 48, 50 and 52 together were removed, the flanges being easily separated at least at the interfaces between foils such as 54 and 56. The outer hard tooling 20 is separated easily from preform 10 at least at the interface between foils 32 and 36; and inner hard tooling 24 is separated easily from preform 10 at least at the interface between foils 38 and 40. Through practice of this form of the present invention, close tolerance surfaces 22 and 26 of hard tooling 20 and 24, as well as mating flange surfaces, such as 58 and 60, are preserved to enable reuse of the hard tooling.

The present invention has been described in connection with a variety of specific forms, embodiments, examples, materials, etc. However, it should be understood that they are intended to be representative of, rather than in any way limiting on, the scope of the invention. Those skilled in the various arts involved will understand that the invention is capable of variations and modifications without departing from the scope of the appended claims.

What is claimed is:

1. In spaced apart tooling for applying pressure to consolidate a workpiece there-between, the workpiece comprising spaced apart first and second workpiece surfaces at which consolidating pressure is applied:

a first plurality of distinct, superimposed sacrificial sheets, in contact one with another, for disposition at the first workpiece surface;

a second plurality of distinct, superimposed sacrificial sheets, in contact one with another, for disposition at the second workpiece surface;

each of the first and second plurality of sheets including an inner sheet for disposition at and contact with a workpiece surface and an outer sheet for disposition at and contact with a tooling surface, the inner and outer sheets being substantially non-adherent one with the other, the inner sheets being substantially chemically non-reactive with its respective workpiece surface.

2. The tooling of claim 1 in which the first and second plurality of sheets are metal foils.

3. The tooling of claim 2 in which the metal foils are selected from the group consisting of Mo, Ta, W, Cb, and their alloys.

4. The tooling of claim 3 in which the metal foils are Mo.

5. Spaced apart tooling for applying consolidating pressure to a plurality of superimposed workpiece plies therebetween at spaced apart substantially opposed first and second workpiece surfaces for consolidation of the workpiece plies into an article, the tooling comprising:

a first reusable rigid tooling member including a first inner tooling surface;

a second reusable rigid tooling member including a second inner tooling surface;

the first and second tooling members being spaced apart one from the other with the first inner tooling surface spaced apart from and substantially facing the second inner tooling surface;

a first plurality of distinct, superimposed sacrificial sheets in contact one with another and disposed at the first inner tooling surface to isolate the first inner tooling surface from the first workpiece surface, the first plurality of sheets comprising a first outer sacrificial sheet at the first inner tooling surface and a first inner sacrificial sheet disposed over the first outer sacrificial sheet for contact with the first workpiece surface, the first inner sacrificial sheet being chemically substantially non-reactive with the first workpiece surface and substantially non-adherent with the first outer sacrificial sheet at a temperature of up to about 2000° F. under consolidating pressure; and, a second plurality of distinct, superimposed sacrificial sheets in contact one with another and disposed at the second inner tooling surface to isolate the second inner tooling surface from the second workpiece surface, the second plurality of sheets comprising a second outer sacrificial sheet at the second inner tooling surface and a second inner sacrificial sheet disposed over the second outer sacrificial sheet for contact with the second workpiece surface, the second inner sacrificial sheet being chemically substantially non-reactive with the second workpiece surface and substantially non-adherent with the second outer sacrificial sheet at a temperature of up to about 2000° F. under consolidating pressure.

6. The tooling of claim 5 in which the first and second plurality of sacrificial sheets are metal foils.

7. The tooling of claim 6 in which the metal foils are selected from the group consisting of Mo, Ta, W, Cb, and their alloys.

8. The tooling of claim 7 in which the metal foils are Mo.

9. The tooling of claim 6 in which:

the first tooling member comprises a plurality of segments including split flanges there between, the flanges having cooperating surfaces; and, the second tooling member is a mandrel to receive the workpiece.

10. The tooling of claim 9 in which the first and second tooling members are made of a metal selected from the group consisting of Fe, Ni, Co, and their alloys.

11. The tooling of claim 9 in which a plurality of distinct sacrificial sheets substantially non-adherent one with another are disposed between cooperating surfaces of at least one of the flanges.

12. In a method for consolidating a workpiece between spaced apart first and second substantially rigid tooling surfaces, the workpiece including spaced apart first and second workpiece surfaces in juxtaposition respectively with the first and second tooling surfaces, the steps prior to consolidation of:

disposing a first plurality of distinct, superimposed sacrificial sheets in contact one with another between the first tooling surface and the first workpiece surface; and, disposing a second plurality of distinct, superimposed sacrificial sheets in contact one with another between the second tooling surface and the second workpiece surface;

each of the first and second plurality of sheets including an inner sheet for disposition at and in contact with a workpiece surface and an outer sheet for disposition at and in contact with a tooling surface, the inner and outer sheets being substantially non-adherent one with another, the inner sheet being substantially chemically non-reactive with its respective workpiece surface.

13. The method of claim 12 in which the first and second plurality of sheets are metal foils.

14. The method of claim 13 in which:

the first and second workpiece surfaces include at least a Ti matrix;

the tooling surfaces are made of a metal selected from the group consisting of Fe, Ni, Co, and their alloys; and, the metal foils are selected from the group consisting of Mo, Ta, W, Cb, and their alloys.

* * * * *